United States Patent [19]

Roberts

[11] 4,175,803

[45] Nov. 27, 1979

[54] BEARING ASSEMBLY BETWEEN INNER AND OUTER SHAFTS HAVING TWO ROLLER BEARINGS AND TWO HYDRODYNAMIC OR SQUEEZE FILM BEARINGS

[75] Inventor: Derek A. Roberts, Bristol, England

[73] Assignee: Rolls-Royce Limited, London, England

[21] Appl. No.: 910,671

[22] Filed: May 30, 1978

[30] Foreign Application Priority Data

Jun. 14, 1977 [GB] United Kingdom ............... 24888/77

[51] Int. Cl.² ............................................ F16C 27/04
[52] U.S. Cl. .................... 308/9; 308/184 R; 308/207 R
[58] Field of Search ...... 308/9, 26, DIG. 1, DIG. 15, 308/187, 184, 189, 207; 417/405

[56] References Cited

U.S. PATENT DOCUMENTS

| 3,756,672 | 9/1973 | Hibner et al. | 308/189 A X |
| 4,046,430 | 9/1977 | Buono et al. | 308/184 R X |

FOREIGN PATENT DOCUMENTS

| 78479 | 2/1955 | Netherlands | 308/184 R |
| 937515 | 9/1963 | United Kingdom . | |

Primary Examiner—Douglas C. Butler
Attorney, Agent, or Firm—Stevens, Davis, Miller & Mosher

[57] ABSTRACT

A bearing assembly between an inner and an outer shaft has two rolling bearings and two hydrodynamic or squeeze film bearings. The one film bearing is arranged between the outer race of the one rolling bearing and the outer shaft to damp vibration of the inner shaft. The other film bearing is arranged between the inner race of the other rolling bearing and the inner shaft to damp vibration of the outer shaft.

3 Claims, 3 Drawing Figures

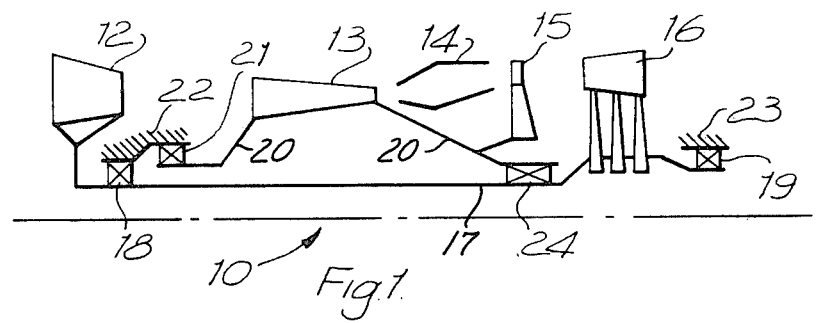
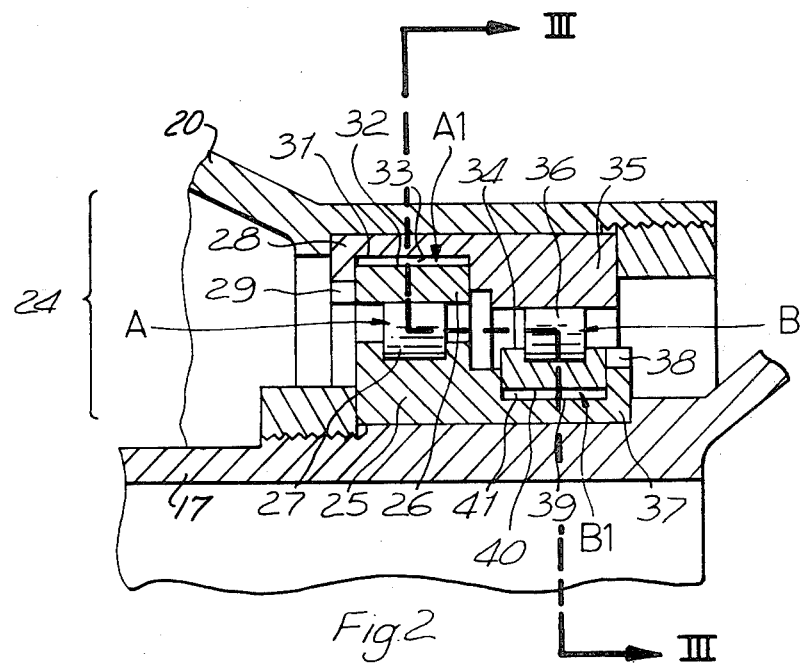

BEARING ASSEMBLY BETWEEN INNER AND OUTER SHAFTS HAVING TWO ROLLER BEARINGS AND TWO HYDRODYNAMIC OR SQUEEZE FILM BEARINGS

This invention relates to a bearing assembly of the kind comprising a rotary motion bearing in combination with a hydrodynamic film bearing. It is known to provide such a bearing assembly for the support of a rotary member on fixed structure, the purpose of the hydrodynamic film bearing being to damp vibrations in the rotary member due to unbalanced forces acting thereon. It is an object of this invention to provide a bearing assembly in which one rotary member is supported on another rotary member, the members being rotatable at different speeds or in opposite directions, and wherein it is desired to provide vibration damping for either member.

According to this invention there is provided a bearing assembly comprising two respectively radially inner and outer rotary members, two rotary motion bearings each arranged radially between said members and each having an inner and an outer race, said inner member and the inner race of the one rotary motion bearing radially relatively fixed, said outer member and the outer race of the one rotary motion bearing being radially relatively movable, means defining a first hydrodynamic film bearing between said outer member and the outer race of the one rotary motion bearing, said outer member and the outer race of the other rotary motion bearing being radially relatively fixed, said inner member and the inner race of the other rotary motion bearing being radially relatively movable, and means defining a second hydrodynamic film bearing between said inner member and inner race of the other rotary motion bearing.

In use, the first hydrodynamic bearing damps vibration of the inner rotary member relative to the outer rotary member and the second hydrodynamic bearing damps vibration of the outer rotary member relative to the inner rotary member.

An embodiment of the invention will now be described, by way of example only, and with reference to the accompanying drawings in which:

FIG. 1 is a schematic representation of a gas turbine engine including the invention.

FIG. 2 is an enlarged detail of the bearing 24 of FIG. 1.

Figure 3:
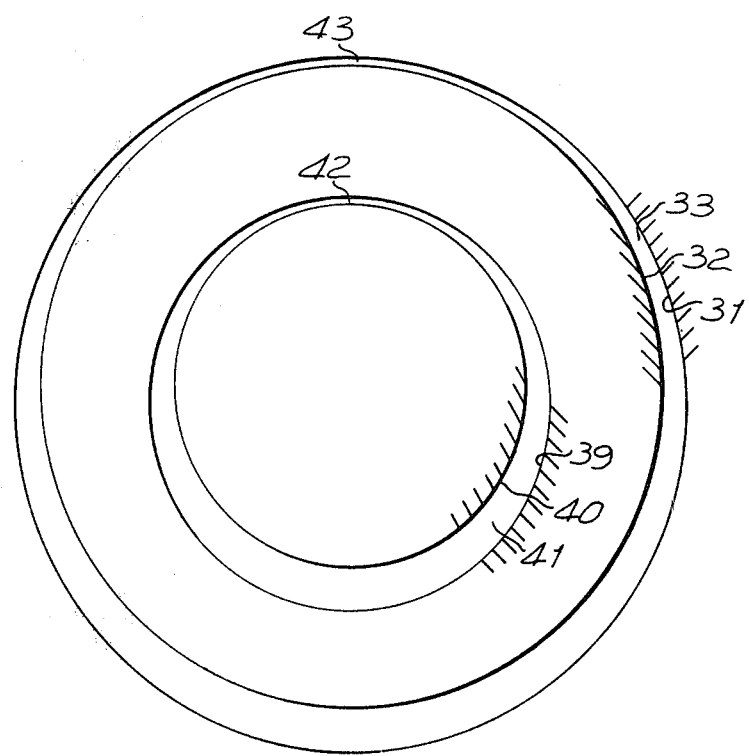
FIG. 3 is a sectional view along the line III—III of FIG. 2 and shows the complete assembly in cross-section.

Referring to FIG. 1, a gas turbine engine 10 comprises in flow series a low pressure compressor 12, a high pressure compressor 13, combustion equipment 14, a high pressure turbine 15, and a low pressure turbine 16. The low pressure compressor 12 and the low pressure turbine 16 are each secured to a shaft 17 rotatably mounted at its respective ends in bearings 18 and 19 which are supported on static engine structure 22,23. The high pressure compressor 13 and the high pressure turbine 15 are each secured to a shaft 20 surrounding the shaft 17. At its one end the shaft 20 is supported by a bearing 21 in turn supported by the static structure 22. At its other end the shaft 20 is supported on the shaft 17 by a bearing assembly 24.

Referring to FIG. 2 the bearing assembly 24 comprises a first and second rotary motion bearing A,B and two hydrodynamic film bearings A1,B1. The bearing A comprises an inner race 25, an outer race 26 and rollers 27 arranged therebetween. The inner race 25 is secured to the shaft 17 so as to be radially fixed relative to that shaft. The outer race 26 is radially movable relative to a member 28 secured to the inside of the shaft 20 but relative rotation between the race 26 and member 28 is prevented by dogs 29. The outer race 26 and the member 28 have respective annular surfaces 31,32 which confront one another across a clearance 33 filled by a film of oil. The surfaces 31,32 and the oil in the clearance 33 constitute the hydrodynamic film bearing A1.

The bearing B comprises an inner race 34, an outer race 35 and rollers 36 arranged therebetween. The outer race 35 is secured to the interior of the shaft 20 so as to be radially fixed relative to that shaft. The inner race 34 is radially movable relative to a member 37 secured to the shaft 17 but relative rotation between the race 34 and the member 37 is prevented by dogs 38. The inner race 34 and the member 37 have respective annular surfaces 39,40 which confront one another across a clearance 41 filled by a film of oil. The surfaces 39,40 and the oil in the clearance 41 constitute the hydrodynamic film bearing B1.

In the present example the inner race 25 of the bearing A is integral with the member 37 but this race and member may be separate components secured individually to the shaft 17. On the other hand the race 25 and the member 37 may be integral with the shaft 17. In any case the inner race 25, the member 37 and the shaft 17 constitute a single rotary member as far as the operation of the bearing assembly 24 is concerned. Similarly, the outer race 26, the member 28 and the shaft 20 constitute, for operational purposes, a single member.

For purposes of explaining the operation of the bearing assembly 24 it is at first assumed that the shaft 17 stands still, that the shaft 20 rotates, and that due to an unbalanced force the shaft 20 tends to make an orbital motion having the same frequency as its rotation. The orbital motion is accommodated to a certain extent by the radial clearances 33,41 of the bearings A1,B1 but only the bearing B1 functions as a hydrodynamic film bearing in the assumed condition of the shaft 17 being stationary. This is explained as follows.

As regards the bearing B1, since the shaft 17 is assumed to stand still, the inner race 34 does not rotate but it does participate in the orbital motion of the shaft 20. As a result the annular surfaces 39,40 have a mutually eccentric position (FIG. 3) and have between them a region 42 of closest proximity which moves around the annular clearance 41 relative to the surfaces 39,40. This relative movement of the region of closest proximity is a requirement of hydrodynamic film bearings and is associated with the vibration-damping properties of such bearings.

In the bearing A1, there is a region 43 of closest proximity between the annular surfaces 31,32, but since both these surfaces rotate together the region 43 does not travel relative to the surfaces 31,32. There is therefore no hydrodynamic action in the bearing A1 in the circumstances of the shaft 20 having orbital and rotary motion while shaft 17 stands still.

It will be clear that if the circumstances are reversed, i.e. if the shaft 20 stands still while the shaft 17 has orbital and rotary motion, the bearing A1 functions as a hydrodynamic film bearing while the bearing B1 merely accommodates an eccentric dispostion between the race 34 and the member 37. If both shafts 17,20 rotate, as is the case in practice, then either of the bearings A1,B1 function as a hydrodynamic film bearing depending on which of the shafts tends to be off balance. There may therefore be circumstances in which both bearings A1,B1 may act hydrodynamically.

In FIGS. 2 and 3 the size of the clearances 33,41 has been exaggerated for clarity of illustration. In reality these clearances may have a mean value of say 0.005 inch or 0.12 mm. The construction of the hydrodynamic bearings A1,B1 is known per se e.g. from United Kingdom Pat. No. 937,515. Means, well known in the art, are provided for supplying oil to the clearances 33,41. One example of such means is shown in the British patent. The rotary motion bearings used in combination with the such hydrodynamic bearings may be any kind of rolling element bearing. The hydrodynamic film bearings are also known as "squeeze film bearings".

Reverting to FIG. 1, the shaft 20 constitutes, generally, an elongate rotary member supported at one end for rotation on the fixed structure 22 by the bearing 23 and at the other end on another rotary member by the bearing assembly 24. As regards the shaft 17 this constitutes, generally, an elongate rotary member supported at opposite ends on the fixed structures 22,23 by the bearings 18,19, and intermediate between its ends the shaft 17 supports or is supported by another rotary member by the bearing assembly 24.

I claim:

1. A bearing assembly comprising two respectively radially inner and outer rotary members, first and second rotary motion bearings each arranged radially between said members and each having an inner and an outer race, said inner member and the inner race of the first rotary motion bearing being radially relatively fixed, said outer member and the outer race of the first rotary motion bearing being radially relatively movable, means defining a first hydrodynamic film bearing between said outer member and the outer race of the first rotary motion bearing, said outer member and the outer race of the second rotary motion bearing being radially relatively fixed, said inner member and the inner race of the second rotary motion bearing being radially relatively movable, and means defining a second hydrodynamic film bearing between said inner member and inner race of the second rotary motion bearing.

2. A bearing assembly according to claim 1 in combination with fixed structure, one of said rotary members comprising a shaft, said first and second rotary motion bearings and two hydrodynamic film bearings supporting the shaft at one end thereof on the other of said rotary members, and a further rotary motion bearing supporting the other end of said shaft on said fixed structure.

3. A bearing assembly according to claim 1 in combination with fixed structure, one of said rotary members being a shaft, said first and second rotary motion bearings and two hydrodynamic film bearings being arranged between the other of said rotary members and said shaft at a location intermediate the ends of the shaft, and two further rotary motion bearings supporting the ends of the shaft on said fixed structure.

* * * * *